US008469786B2

(12) United States Patent
Suttle

(10) Patent No.: US 8,469,786 B2
(45) Date of Patent: Jun. 25, 2013

(54) POKER SYSTEM AND METHOD INVOLVING BAD BEAT AND/OR BEST HAND POOLS

(75) Inventor: James Suttle, North Las Vegas, NV (US)

(73) Assignee: Tru Odds Poker, LLC, North Las Vegas, NV (US)

( * ) Notice: Subject to any disclaimer, the term of this patent is extended or adjusted under 35 U.S.C. 154(b) by 72 days.

(21) Appl. No.: 13/215,056

(22) Filed: Aug. 22, 2011

(65) Prior Publication Data

US 2012/0214566 A1 Aug. 23, 2012

Related U.S. Application Data

(63) Continuation-in-part of application No. 13/030,478, filed on Feb. 18, 2011.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................. 463/13; 463/11; 463/16; 463/20; 463/42; 273/292; 273/309

(58) Field of Classification Search
USPC .................... 463/11, 13, 16, 20, 42; 273/292, 273/309
See application file for complete search history.

(56) References Cited

U.S. PATENT DOCUMENTS

| | | | | |
|---|---|---|---|---|
| 6,070,873 | A | 6/2000 | Perkins | |
| 2003/0052452 | A1 | 3/2003 | Spur | |
| 2006/0205484 | A1 | 9/2006 | Nicastro | |
| 2007/0173318 | A1 | 7/2007 | Abbott | |
| 2008/0088087 | A1 | 4/2008 | Weitzman et al. | |
| 2008/0237985 | A1 | 10/2008 | Cogert et al. | |
| 2009/0117989 | A1 * | 5/2009 | Arezina et al. | 463/20 |
| 2009/0124314 | A1 * | 5/2009 | Halligan et al. | 463/13 |

FOREIGN PATENT DOCUMENTS

| | | | |
|---|---|---|---|
| KR | 10-2005-0099073 | A | 10/2005 |
| WO | WO 2010-143005 | A1 | 12/2010 |

* cited by examiner

*Primary Examiner* — Omkar Deodhar
*Assistant Examiner* — Adetokunbo O Torimiro
(74) *Attorney, Agent, or Firm* — Greenberg Traurig

(57) ABSTRACT

A bad beat or best hand system/method generates a bad beat or best hand pool from buy-in fees or designated bad beat or best hand tournament fees. The bad beat pool is paid to a player suffering a most significant or worst bad beat during the poker tournament. The best hand pool is paid to the player obtaining the highest ranking winning hand during the poker tournament. With both the bad beat pool and best hand pool, the system/method may incorporate minimum thresholds or hand ranks, which if not met, result in the bad beat or best hand pool being carried over to a next tournament creating larger and more attractive pools. Rather than awarding the bad beat or best hand pool to a single player, multiple players may also share in the bad beat or best hand pool based on a distribution scheme.

4 Claims, 6 Drawing Sheets

POKER SYSTEM AND METHOD INVOLVING BAD BEAT AND/OR BEST HAND POOLS

CROSS-REFERENCE

This application is a continuation-in-part of U.S. patent application Ser. No. 13/030,478 filed on Feb. 18, 2011.

FIELD OF THE INVENTION

The embodiments of the present invention relate to poker tournaments system and method for generating bad beat and best hand pools which provide payouts to players which may, in some embodiments, carry over from one poker tournament to another.

BACKGROUND

Poker has become a very popular game to the masses because of televised poker events and online remote access to live poker games. In other words, poker play is more mainstream and access is greatly improved. While poker has become very popular, there continue to be negative situations arising during poker games which may cause players to become discouraged with poker. One primary negative situation is the draw out during which a player having a lower probability of winning a poker hand beats one or more other players. For example, in Texas Hold'em a draw out can occur when a first player holds three of a kind after the turn and a second player holds an inside straight draw. If the second player hits the card needed to complete the straight, the first player has been drawn out. One or more draw outs during a poker tournament can discourage tournament players lowering the number of players entering tournaments and thus lowering operator revenue.

Therefore, it would be beneficial to incorporate a system and method for rewarding in some fashion players suffering from bad beats during poker tournaments. Advantageously, the bad beat system and method should be configured to allow operators to generate additional revenue.

SUMMARY

Accordingly, a first embodiment of the present invention is a point generation system and method whereby players aggregate points during a poker tournament based on being subjected to draw outs. In one embodiment, points are derived from the initial odds of the drawn out player winning the hand. For example, if a first player has an 80% chance of winning a hand against a second player after no more bets are possible, the first player is awarded 80 points correlating to the 80% chance of winning. The points may then be given a monetary value (e.g., 10 cents per point). Once the tournament ends, players may be awarded payouts commensurate with the earned points until the draw out pool is exhausted. Alternatively, a pre-established number (e.g., 10) of top point earners may split the draw out pool in a pre-established fashion. To fund the draw out payouts, players may pay an extra fee to participate in the tournament or some portion of the existing tournament fee may be allocated to a draw out pool.

The draw out payouts may be established by the house or operator. Similarly, as explained in more detail below, the house or operator can determine the number of tournament players to receive draw out payouts and the amounts thereof. In general, the embodiments of the present invention seek to reward or reimburse a player for being subjected to numerous draw outs during a tournament. A large number of draw outs decreases or prevents the player from cashing and more so winning the tournament.

In another embodiment, a bad beat pool is funded by enhanced tournament fees and is paid to a player suffering the worst bad beat during the tournament. In another embodiment, the bad beat pool is shared by multiple players suffering the two or more worst bad beats during the tournament. In another embodiment, the bad beat pool is paid only responsive to a bad beat meeting pre-established condition (e.g., 4 Queens beaten by 4 Kings or minimum threshold). If a bad beat does not meet the condition does not occur during the tournament, the bad beat pool carries over to the next similar tournament and is added to the new bad beat pool creating a larger, more attractive pool. The bad beat pool may be offered in conjunction with the draw out embodiment or independently thereof. It is also conceivable, as detailed below, to fund a best hand pool such that the one or more best hands occurring during the tournament receive all or a portion of the best hand pool.

Other variations, embodiments and features of the present invention will become evident from the following detailed description, drawings and claims.

DETAILED DESCRIPTION

Figure 1:
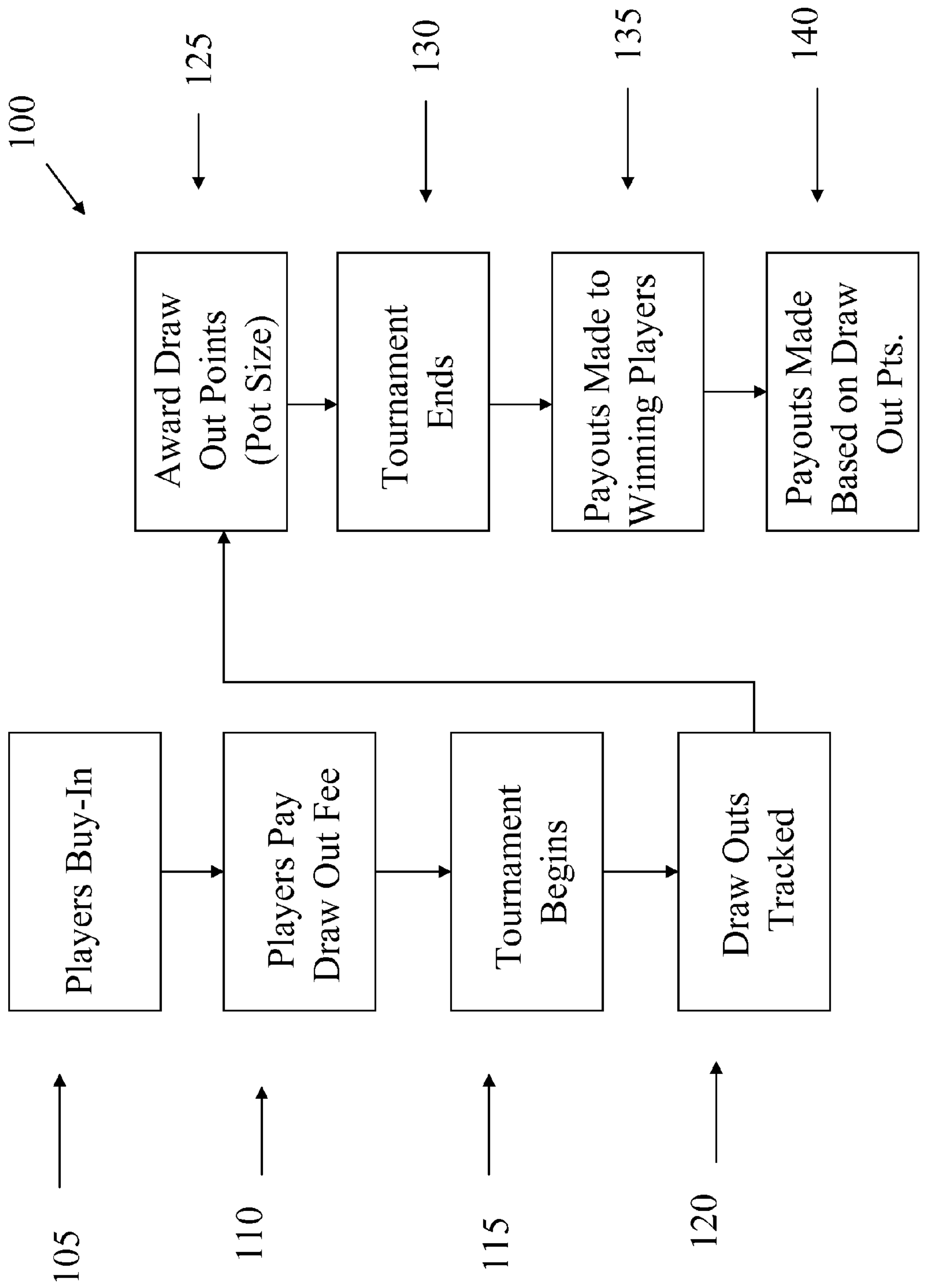
FIG. 1 illustrates a flow chart detailing one embodiment according to the embodiments of the present invention.

For the purpose of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

The embodiments of the present invention relate to a system and method for rewarding players subjected to one or more draw outs during a poker tournament. The poker game may any type including Texas Hold'em, Omaha and Stud. For the sake of brevity, the detailed description focuses on Texas Hold'em. The embodiments of the present invention are also suitable for both electronically implemented poker tournaments and live poker tournaments.

In a first embodiment, an electronically implemented poker tournament is facilitated by online systems or other electronic means. In an online system, remote users (i.e., poker players) access a dedicated website to participate in poker games and tournaments. Online systems are facilitated by one or more servers which host the dedicated website and run poker software which players access via a computer terminal (e.g., desktop or laptop) or hand-held device (e.g., smart phone, cellular phone, PDA, etc.). Online poker websites are well-known such that the specific technology behind such websites is not necessary other than as described herein to explain the embodiments of the present invention.

FIG. 1 shows a flow chart 100 detailing one embodiment of the present invention. At 105, players buy-in a tournament. The amount of the buy-in fee is established by the operator or house. At 110, players pay a draw out fee. Again, the amount of the draw out fee is established by the operator or house. Ideally, the amount of the draw out fee is a percentage of the buy-in fee. For example, if the buy-in fee is $100 the draw out fee may be $10. Therefore, if the tournament attracts 500 players, the tournament prize pool is $50,000 and the draw out pool is $5,000. The operator retains a pre-established percentage (e.g., 15%) or certain amount of the draw out pool which increases operator revenue. At 115, the tournament begins. At 120, draw outs occurring during the tournament are tracked. Draw outs occur when there are two or more players remaining in the hand but no more betting can occur. That is, one or more players remain and one or both players are all in. Or three players remain and two or more are all in. In this embodiment, at 125, players subjected to a draw out receive points based on a odds/percentages as described below.

In one embodiment, as shown in FIG. 1, the points are calculated based on the odds/percentages associated with the losing player winning the hand at the point in time when the betting ended. For example, a first player holding a pair of Aces prior to the flop has an 81.06% chance of winning the hand against a second player holding a pair of Kings who has an 18.55% chance of winning (there is a 0.39% chance the hand ends in a tie). Thus, if no betting can occur after the hole cards are dealt and prior to the flop and the second player wins, the first player has been subjected to a draw out resulting in award of 81.06 points commensurate with the odds of the first player winning the hand. Alternatively, the player subjected to the draw out receives points commensurate with the percentages associated with the winning hand. That is, with the previous example, the losing player is awarded 18.55 points. Players drawing out may also receive points commensurate with the odds which may be used to provide payouts to the players drawing out against other players.

In another embodiment, only draw outs in excess of pre-established odds leads to a player earning points. For example, the drawn out player must have at least a 65% chance of winning the hand in order to earn points for being subjected to a draw out. Otherwise, no points are awarded. In another embodiment, as shown in FIG. 2, a simpler system involves awarding each player one point for each draw out without regard to the odds associated with players winning the hand.

Figure 3:
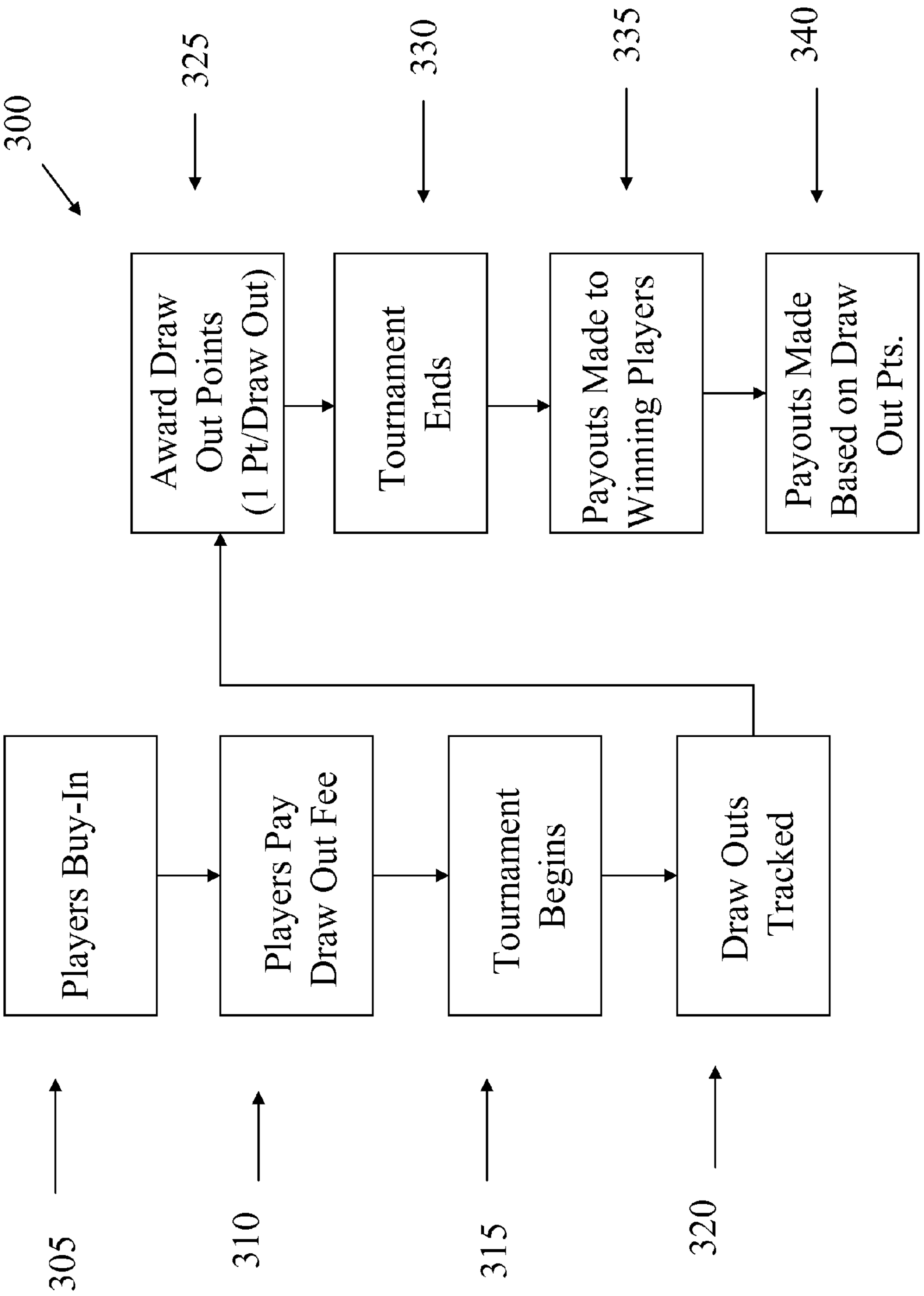
FIG. 3 illustrates a flow chart detailing a third embodiment according to the embodiments of the present invention.

In another embodiment, as shown in FIG. 3, the draw out points are based on the pot amount at the time of the draw out. Therefore, the larger the pot, the more points awarded to the player subjected to the draw out. Prior to the tournament, a tiered pot scheme is generated based on the chips in play. For example, a pot up to $500 corresponds to 10 points; a pot of $501 to $1000 corresponds to 20 points; a pot of $1001 to $3000 corresponds to 30 points; and any pot above $3000 corresponds to a pot of 40 points. Those skilled in the art will recognize that countless point schemes based on the value of the pot are possible and within the spirit and scope of the present invention. When based on the value of the pot, the value of side pots may reduce the points awarded to the player subjected to the draw out. The following example assumes in a Texas Hold'em game that a first player holds a pair of Aces and has $3000; a second player holds a pair of Kings and has $5000; and a third player holds Jack/Queen and has $5200. If the player holding Aces goes all in and the Jack/Queen raises to $5000 and the player with the pair of Kings calls, the main pot is $9000 while the side pot is $4000. Thus, if the player with the Aces is subjected to a draw out, the player wins points corresponding to the $9000 since that is the only pot the player can win. If the player holding the pair of Kings loses the side pot to the player holding the Jack/Queen, the player wins points corresponding to $4000.

At 130, the tournament ends. At 135, players finishing in the money are paid from the prize pool. Conventionally, roughly the final 10% of the total players receive a payout from the tournament prize pool with payouts increasing for players lasting longer in the tournament. For example, the top point earner may receive 25% of the draw out pool and the second place earner may receive 22% and the third place earner may receive 18% and so on. At 140, those players with the most draw out points receive a payout from the draw out pool. In one embodiment, only players not finishing in the money of the tournament are eligible for a payout from the draw out pool. In this embodiment, tracking draw outs may cease once the number of players remaining equals the number of players to be paid from the tournament prize pool. In another embodiment, any and all players are eligible for a payout from the draw out pool. The operator or house may establish rules for payouts from the draw out pool. For example, the players corresponding to the top ten point totals may receive a payout from the draw out pool based on a pre-established apportionment formula. Alternatively, the points may be monetized in a pre-established manner (e.g., each point is worth 10 cents). The draw out pool is then used to pay the top point earners until the draw out pool is exhausted.

Figure 2:
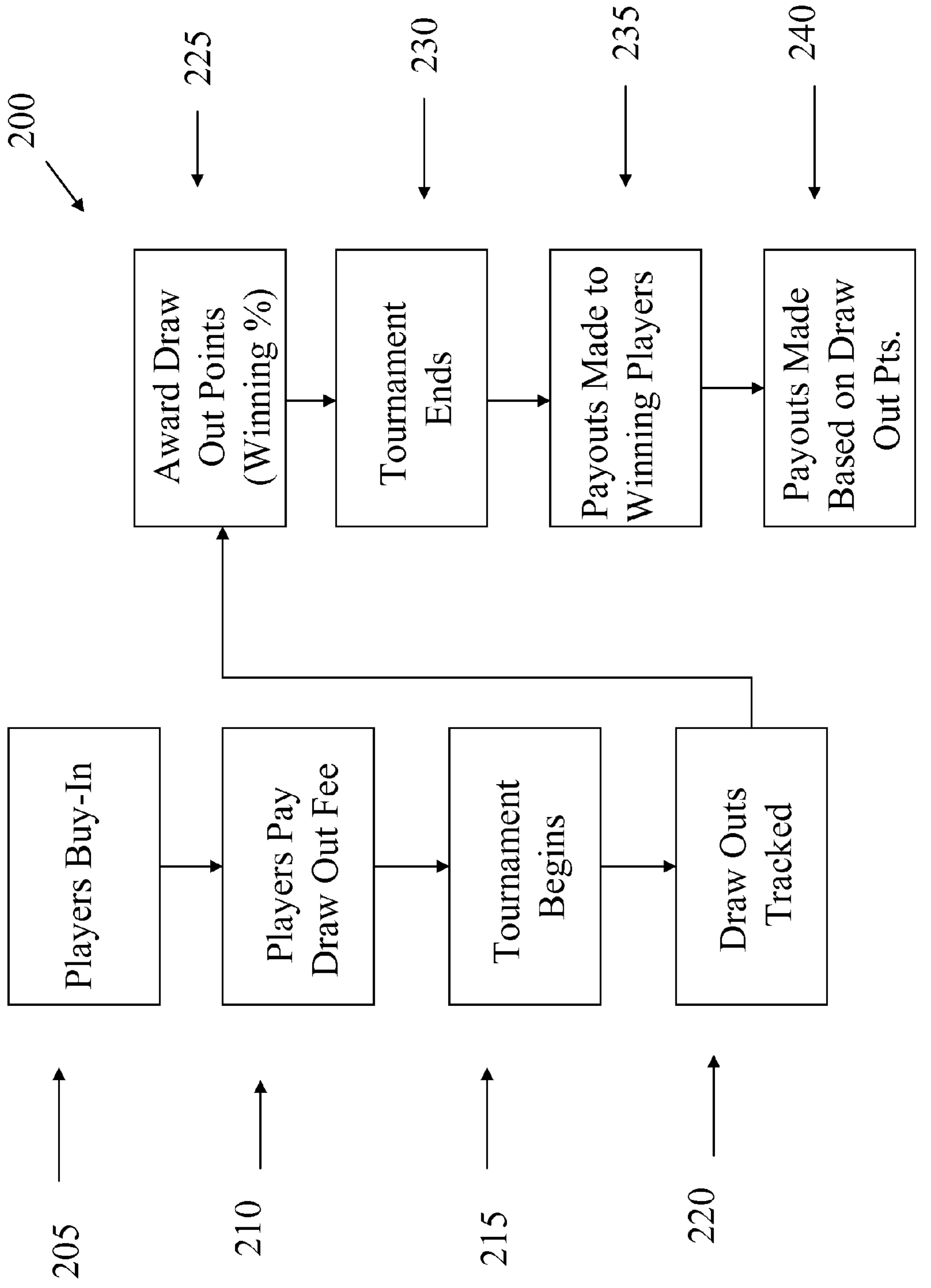
FIG. 2 illustrates a flow chart detailing a second embodiment according to the embodiments of the present invention.

FIG. 2 shows a flow chart 200 detailing one embodiment of the present invention. At 205, players buy-in a tournament. At 210, players pay a draw out fee. Again, the amount of the draw out fee is established by the operator or house. At 215, the tournament begins. At 220, draw outs occurring during the tournament are tracked. At 225, players subjected to a draw out receive points based on a simple point per draw out formula. At 230, the tournament ends. At 235, players finishing in the money are paid from the prize pool. At 240, those players with the most draw out points receive a payout from the draw out pool.

FIG. 3 shows a flow chart 300 detailing one embodiment of the present invention. At 305, players buy-in a tournament. At 310, players pay a draw out fee. Again, the amount of the draw out fee is established by the operator or house. At 315, the tournament begins. At 320, draw outs occurring during the tournament are tracked. At 325, players subjected to a draw out receive points based on a simple point per draw out formula. At 330, the tournament ends. At 335, players finishing in the money are paid from the prize pool. At 340, those players with the most draw out points receive a payout from the draw out pool.

In an online environment, poker software maintained on an Internet server tracks draw outs as they occur and calculates points (regardless of the method) associated therewith. Real time draw out point totals are displayed for players to observe top point earners akin to displaying tournament chip leaders. Online poker websites incorporate tournament data of which draw out points may be another. The software also facilitates payouts from the tournament prize pool and draw out pool whether based on percentages, pot size, simple point system and the like. The Internet server is accessible via a computer terminals or hand-held device (e.g., smart phone). Those skilled in the art will understand that the operation and functionality of online poker websites are well-known and need not be described with great detail herein.

In another embodiment of the present invention, a bad beat pool is funded using some portion of poker tournament entry fees. The bad beat pool may be funded using a percentage of the conventional poker tournament fee or an add-on fee earmarked to fund the bad beat pool. In another embodiment, a percentage (e.g., 50%) of the draw out pool funds the bad beat pool. Regardless of how the bad beat pool is funded, the bad beat pool is used to pay one or more players suffering significant bad beats during a poker tournament. The operator also collects a portion of the bad beat pool as revenue. For example, the operator may collect 10% of the bad beat pool and pay out 90% to one or more players.

Figure 4:
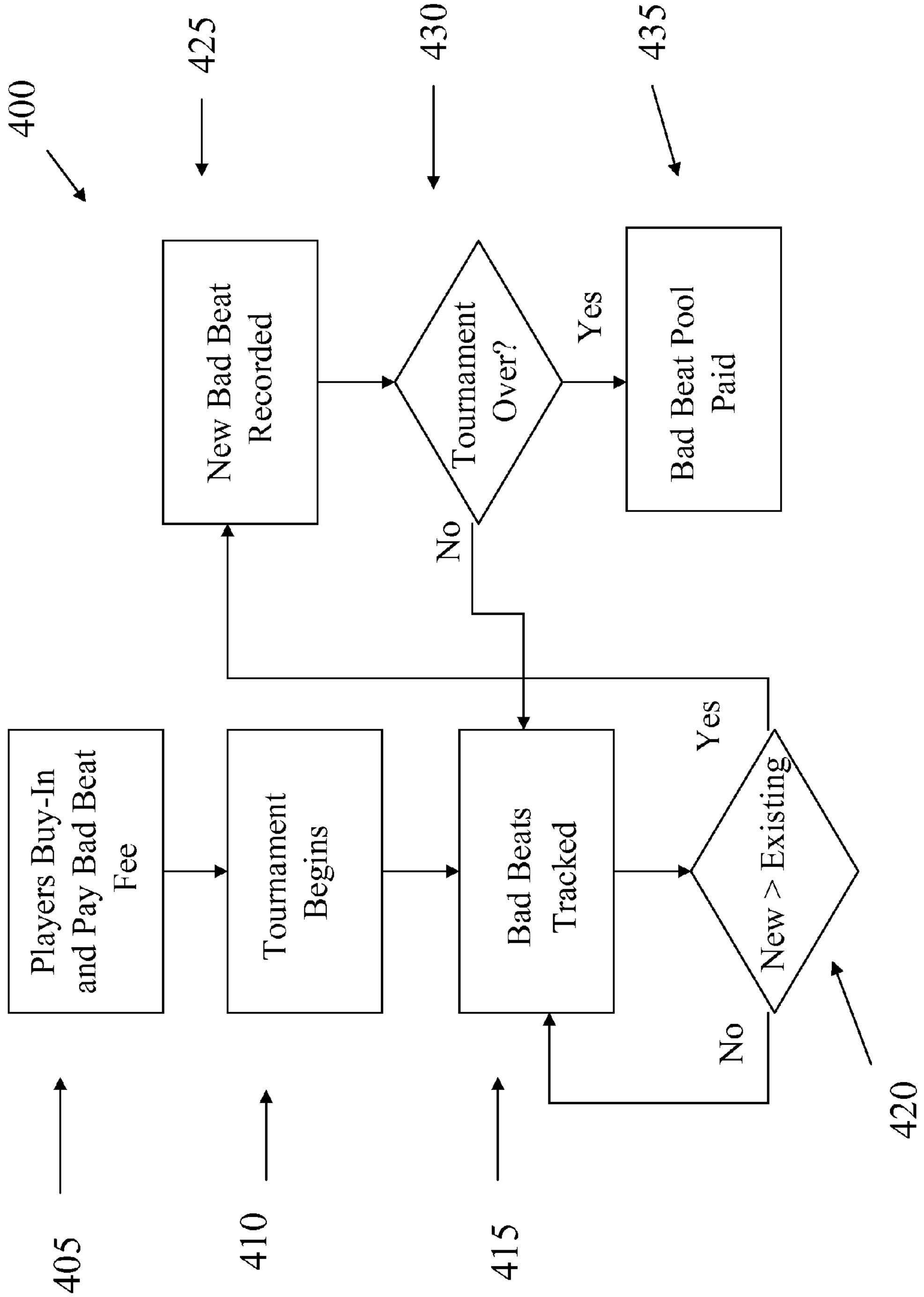
FIG. 4 illustrates a flow chart detailing a first bad beat pool embodiment according to the embodiments of the present invention.

FIG. 4 shows a flow chart 400 detailing a first embodiment of the bad beat pool. At 405, players pay the tournament entry or buy-in fee which may include the conventional tournament fee, draw out fee and/or bad beat fee. At 410, the tournament begins. At 415, bad beats are tracked either electronically (i.e., online poker tournament) or by live dealers. In this embodiment, the bad beat pool is paid to the player suffering the worst or most significant bad beat during the tournament. The worst bad beat is determined by evaluating a player's chance of winning a poker hand who then loses the poker hand. Bad beat evaluations are made when no more betting is possible during the hand. For example, heads-up with one or both players all in. At 420, each successive bad beat is compared to a previous stored most significant bad beat to determine is a new or current bad beat is more significant than the stored most significant bad beat. If the current identified bad beat is more significant than that stored, at 425, the new bad beat and player is recorded and replaces the previous bad beat and associated player. If not, the chart 400 loops back to 415. At 430, the tournament ends. At 435, the player associated with the identified worst bad beat is paid the bad beat pool. In another embodiment, the bad beat pool is paid out to multiple players based on the top several worst bad beats during the tournament. For example, the player suffering the worst bad beat is paid 50% of the bad beat pool, the player suffering the second worst bad beat is paid 30% of the bad beat pool, and the player suffering the third worst bad beat is paid 20% of the bad beat pool. Those skilled in the art will recognize that any number of players may be paid and any number of distribution schemes are possible.

Figure 5:
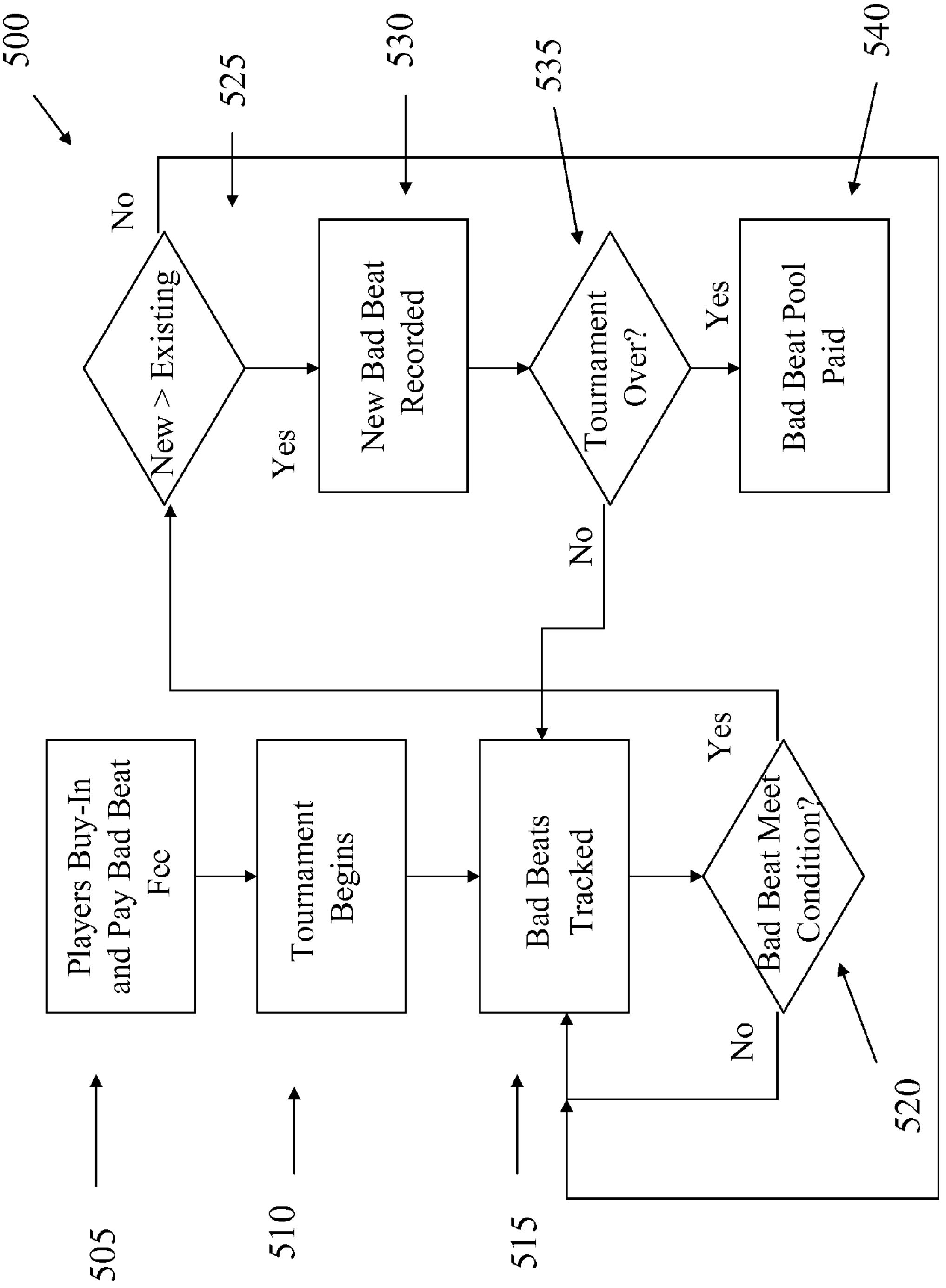
FIG. 5 illustrates a flow chart detailing a second bad beat pool embodiment according to the embodiments of the present invention.

FIG. 5 shows a flow chart 500 detailing a second embodiment of the bad beat pool. At 505, players pay the tournament entry or buy-in fee which may include the conventional tournament fee, draw out fee and/or bad beat fee. At 510, the tournament begins. At 515, bad beats meeting a pre-established condition are tracked either electronically (i.e., online poker tournament) or by live dealers. In this embodiment, the bad beat pool is paid to the player suffering the worst or most significant bad beat during the tournament if the worst bad beat meets a bad beat condition such as a pre-established outcome or minimum threshold. For example, the operator may establish the pre-established bad beat outcome as a player losing a hand comprising four Jacks or better. Alternatively, the operator may establish a bad beat minimum percentage threshold such as 85% meaning that a player with an 85% chance of winning the hand but loses the hand. In either instance, if, during the tournament, the pre-established bad beat condition is not met, the bad beat pool carries over to a next similar tournament creating larger and more attractive pools which encourage more players to play the tournament. Once the specific hand outcome occurs, the worst bad beat is determined by the strongest hand losing. So, four Kings losing a hand is a worst bad beat than four Queens losing a hand. Once the minimum threshold occurs, the worst bad beat is determined by the largest percentage losing hand. So, a hand having a 90% chance of winning and then losing is a worst bad beat than a hand having an 88% chance of winning and then losing. Bad beat evaluations are made when no more betting is possible during the hand. For example, heads-up with one or both players all in. At 520, it is determined if the identified bad beat meets the pre-established condition. If so, at 525, it is determined if the current bad beat is more significant than the existing recorded bad beat. If not, the chart 500 loops back to 515. If so, at 530, the new bad beat is recorded and replaces the existing bad beat. At 535, the tournament ends. At 540, assuming there is a bad beat meeting the pre-established condition, the player associated with the identified worst bad beat is paid the bad beat pool. If no bad beat during the tournament meets the pre-established condition, the bad beat pool is carried over to a next tournament and aggregated with a bad beat pool generated from the subsequent tournament. Such pool carryovers continues until the bad beat pool is paid responsive to the bad beat condition being met. In one embodiment, the bad beat pool carryovers involve successive tournaments having the same parameters (e.g., buy-in fees, limits, game type, etc.) as the original tournament.

Figure 6:
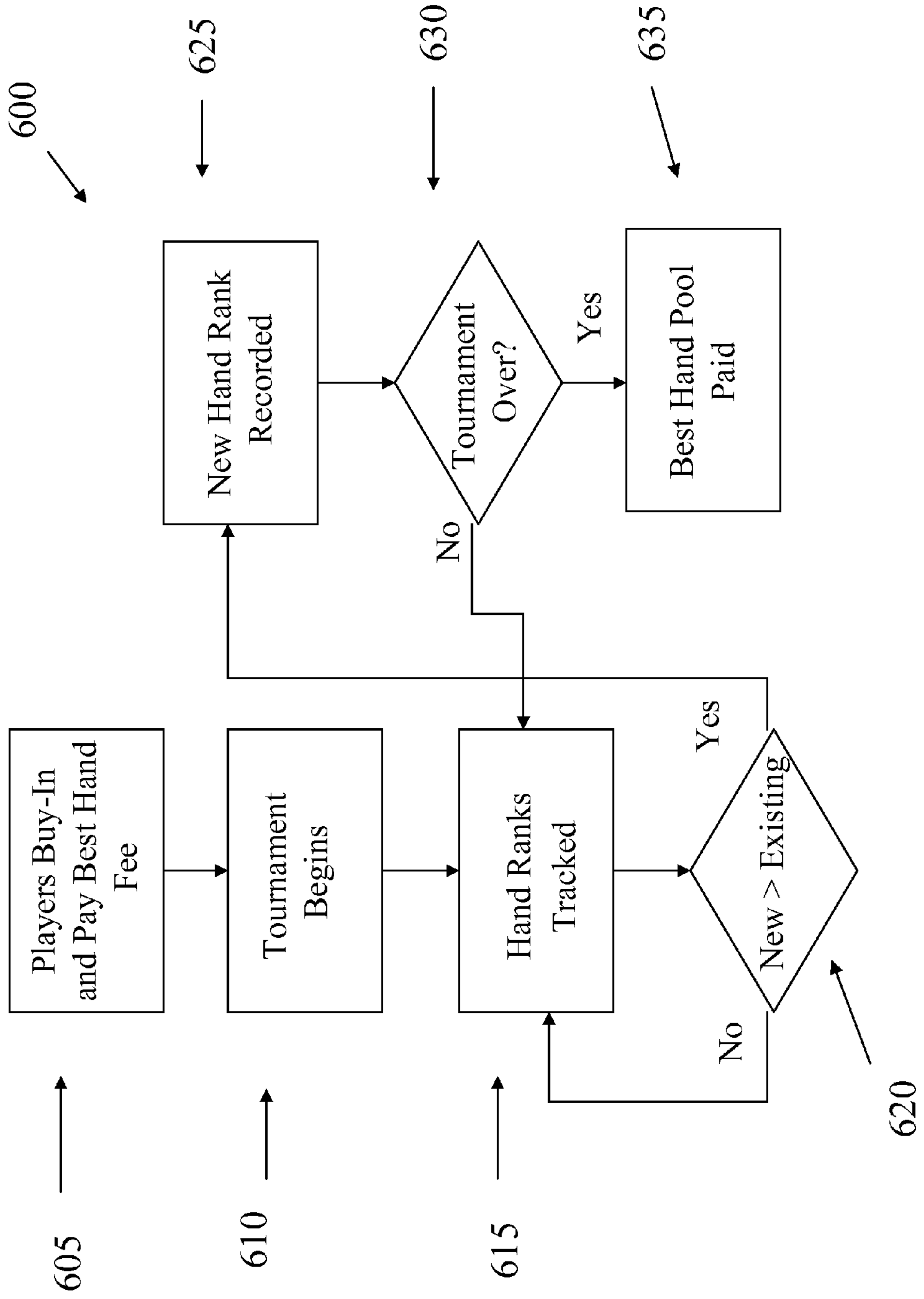
FIG. 6 illustrates a flow chart detailing a best hand pool embodiment according to the embodiments of the present invention.

FIG. 6 shows a flow chart 600 detailing one embodiment of a best hand pool. At 605, players pay the tournament entry or buy-in fee which may include the conventional tournament fee, draw out fee and/or best hand fee. At 610, the tournament begins. At 615, winning hand rankings are tracked either electronically (i.e., online poker tournament) or by live dealers. In this embodiment, the best hand pool is paid to the player having the highest ranking hand during the tournament. At 620, each successive winning hand rank is compared to a previous stored highest hand rank to determine if the new or current hand rank is higher ranking than the stored highest ranking hand. If the current hand rank is higher ranking that the than that stored, at 625, the new hand ranking and player is recorded and replaces the previous hand rank and associated player. If not, the chart 600 loops back to 615. At 630, the tournament ends. At 635, the player associated with the identified and recorded highest ranking hand is paid the best hand pool. In another embodiment, the best hand pool is paid out to multiple players based on the top several best hands during the tournament. For example, the player having the best hand is paid 50% of the best hand pool, the player having the second best hand is paid 30% of the best hand pool, and the player having the third best hand is paid 20% of the best hand pool. Those skilled in the art will recognize that any number of players may be paid and any number of distribution schemes are possible. In another embodiment, the operator establishes a minimum hand rank (e.g., four Aces) which must be met in order for the best hand pool to be paid. If not, the best hand pool carries over to a next tournament.

The bad beat pool may be used in live games as well with the tournament dealers tracking the bad beats. Once an initial bad beat is established which meets a pre-established minimum bad beat threshold, it is a simple matter for dealers to identify a worst bad beat as detailed above. One or more leading bad beats can be displayed on a poker room display which is currently used to display blind levels, payouts and number of remaining players. In this manner, tournament dealers are able to observe the current status of the identified bad beats. Depending on the embodiment, the bad beat pool may only be available for players using one or both hole cards.

In other embodiments, the bad beat pool or best hand pool may be funded using a percentage (e.g., 5%) of the tournament buy-in fee or may be funded with a separate designated bad beat or best hand fee. In another embodiment, the draw out fees described above are separated into a draw out pool and bad beat (or best hand) pool. That is, fees received from other poker tournament features may be used, at least in part, to fund the bad beat or best hand pools.

In an online environment, poker software maintained on an Internet server tracks, identifies and records bad beats and best hands during a poker tournament. Poker software also facilitates payouts from the bad beat and best hand pools based on pre-established distribution schemes. The Internet server is accessible via a computer terminals or hand-held device (e.g., smart phone).

Although the invention has been described in detail with reference to several embodiments, additional variations and modifications exist within the scope and spirit of the invention.

I claim:

1. A method of conducting an electronically implemented poker tournament comprising:

configuring a system comprising at least a processor and memory device to facilitate:

identifying bad beats occurring during said poker tournament;

recording in said memory device at least a most significant bad beat occurring during the poker tournament;

comparing said most significant bad beat against a pre-established bad beat condition; and responsive to said most significant bad beat meeting said bad beat condition, paying said bad beat pool to a player suffering said most significant bad beat.

2. The method of claim 1 further comprising carrying the bad beat pool over to a subsequent tournament if said most significant bad beat fails to meet said bad beat condition.

3. The method of claim 1 further comprising establishing the bad beat condition as a minimum ranking for a losing hand.

4. The method of claim 1 further comprising establishing the bad beat condition as a minimum percentage chance of winning the hand.

* * * * *